W. J. NESBITT.
HEEL CUTTING APPARATUS.
APPLICATION FILED JUNE 18, 1917.

1,262,549.

Patented Apr. 9, 1918.
2 SHEETS—SHEET 1.

Witness:
W. M. Gentle.

Inventor.
William J. Nesbitt
By
Attorney.

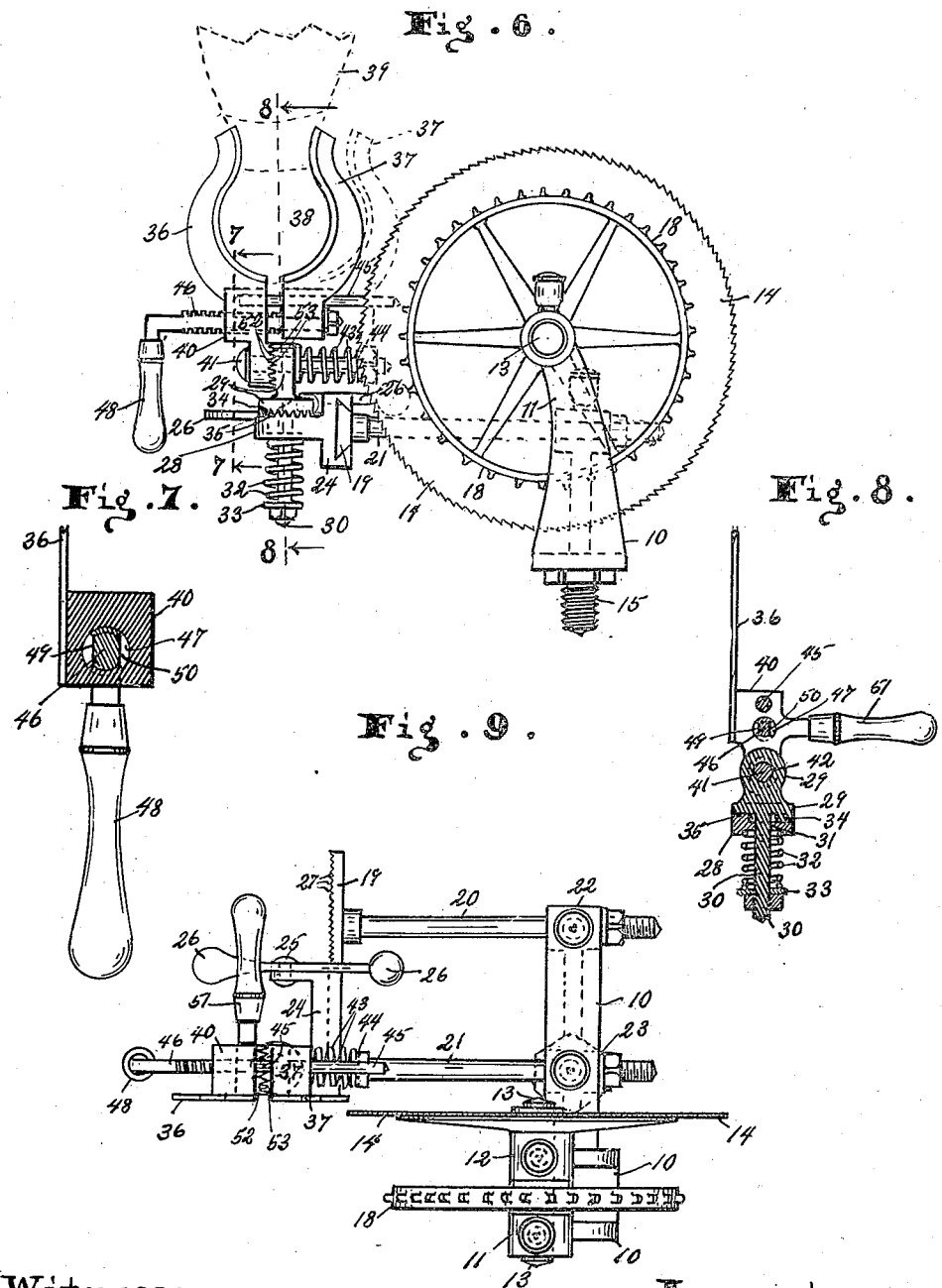

UNITED STATES PATENT OFFICE.

WILLIAM J. NESBITT, OF LOS ANGELES, CALIFORNIA.

HEEL-CUTTING APPARATUS.

1,262,549. Specification of Letters Patent. Patented Apr. 9, 1918.

Application filed June 18, 1917. Serial No. 175,541.

*To all whom it may concern:*

Be it known that I, WILLIAM J. NESBITT, a citizen of the United States of America, residing at Los Angeles, county of Los Angeles, State of California, have invented a certain new and useful Heel-Cutting Apparatus; and I do hereby declare the following to be a full, clear, and exact description of the invention, such as will enable others skilled in the art to which it appertains to make and use the same.

This invention relates to improvements in heel cutting apparatus; and it may be said to consist in the provision of the novel and advantageous features and in the novel and improved construction, arrangement, and combination of parts as will be apparent from the description and claims which follow hereinafter.

The main objects of the invention are to provide a simple and compact construction which is easy and convenient to operate, and which permits of the parts being easily and quickly adjusted so that the various straight and angular cuts can be made through the heel.

Other objects and the advantages of the invention will be apparent to those skilled in the art from a careful consideration of the following description of the preferred construction embodying the invention, taken in connection with the accompanying drawings in which—

Figure 1:
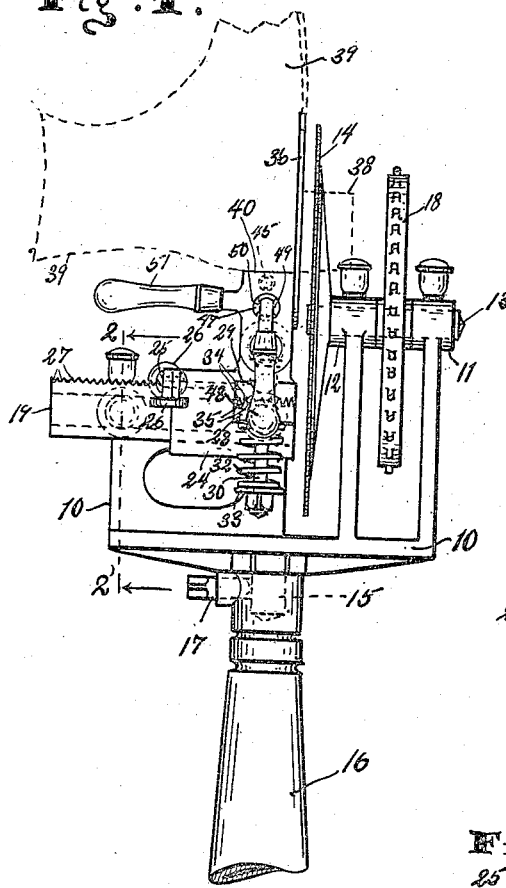
Figure 2:
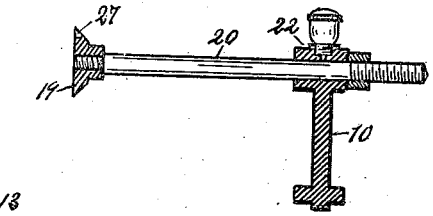
Figure 3:
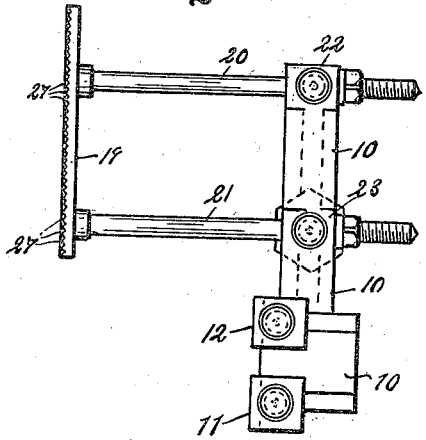
Figure 4:
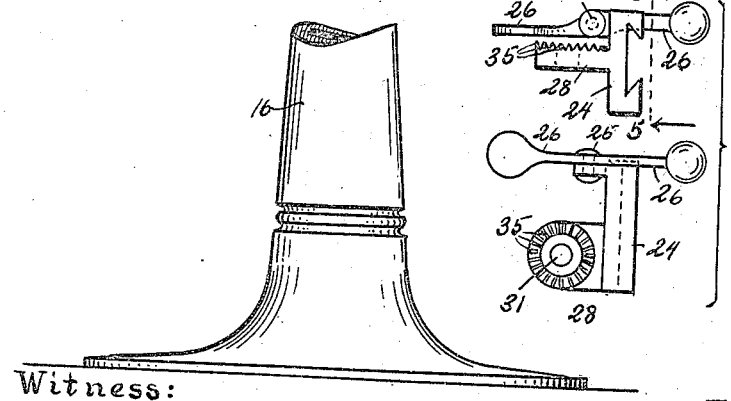
Figure 5:
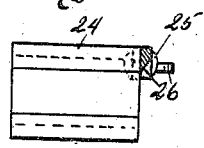

Figure 1 is a broken elevational view of the heel cutting apparatus attached to a pedestal; Fig. 2 is a sectional view taken on the line 2—2 of Fig. 1; Fig. 3 shows a plan view of the frame and the guide bar movably mounted on said frame; Fig. 4 shows elevational and plan views of the slide; Fig. 5 is a sectional view taken on the line 5—5 of Fig. 4; Fig. 6 is a side elevational view of the heel cutting apparatus; Fig. 7 is an enlarged broken sectional view taken on the line 7—7 of Fig. 6; Fig. 8 is a sectional view taken on the line 8—8 of Fig. 6; and Fig. 9 is a plan view of the heel cutting apparatus.

Referring to the drawings, the frame of the heel cutting apparatus consists of the bracket 10 which has thereon the bearings 11 and 12 for the shaft 13 of the circular saw or cutter 14. The bracket 10 has on its underside the stem 15 which is adapted to fit in the socket in the pedestal 16 or other suitable support, said bracket 10 being locked in position on the pedestal 16 by means of the set screw 17 which is adapted to engage the stem 15.

The shaft 13 has thereon the sprocket wheel 18 which may be driven by suitable means to operate the cutter 14. Laterally of the cutter 14 is arranged the guide bar 19 which extends substantially at a right angle to the cutter 14 and is provided with the slide bars 20 and 21 which are fitted in the bearings 22 and 23 on the bracket 10 so that the guide bar 19 can be moved parallel to the cutter 14.

On the guide bar 19 is fitted the slide 24 which has thereon the pivot 25 on which is mounted the weighted latch 26 which is adapted to engage the teeth 27 on the guide bar 19 to hold the slide 24 in adjusted position.

The slide 24 is provided with the extension 28 on which is mounted the part 29 which is provided with the pivot 30 which latter passes through the opening 31 in the extension 28. The part 29 is pressed against the extension 28 by the spring 32 which bears against the underside of the extension 28 and against the washer 33 at the lower end of the pivot 30. In order to positively hold the part 29 in adjusted position on the extension 28, the part 29 is provided with the teeth 34 which are adapted to fit in the notches 35 in the extension 28.

The shoe holding device consists of the curved substantially upright jaws 36 and 37 which are adapted to fit in the crease between the heel seat and the heel 38 of the shoe 39. The jaw 36 is provided with the offset part 40 which has thereon the pivot 41 which latter passes through an opening 42 in the upper part of the part 29. The offset part 40 is pressed against the part 29 by the spring 43 which presses against the upper portion of the part 29 and against the washer 44 on the pivot 41. The jaw 36 has thereon the rearwardly extending arm 45 on which the jaw 37 is slidably mounted. A threaded rod 46 has its rear part pivotally connected to the lower part of the jaw 37 and it is fitted in a threaded opening 47 in the offset part 40; said rod 46 being provided with the handle 48 at its forward end and said rod 46 having its opposite sides 49 and 50 cut away so that said rod can be moved through the opening 47 to move the jaw 37 toward or away from the jaw 36 and then lock the jaw 37 in adjusted position by giving the threaded rod 46 a quarter turn to have it engage the thread in the opening 47. An operating handle 51 is preferably connected to the offset part 40. In order to positively hold the shoe holding device in adjusted position, the offset part 40 is preferably provided with the teeth 52 which are adapted to fit in the notches 53 which are provided in the part 29.

From the foregoing, the construction, manner of use, and the advantages of the improved construction for the heel cutting apparatus will be understood by those skilled in the art. The shoe 39 is placed between the jaws 36 and 37, and then the rod 46 is operated by the handle 48 to move the jaw 37 toward the jaw 36 to have the jaws 36 and 37 fitted in the crease between the heel and heel seat of the shoe 39; whereupon the rod 46 is given a quarter turn to lock the jaw 37 in adjusted position and thereby hold the shoe 39 in clamped position between the jaws 36 and 37. If it is desired to make a straight cut through the heel 38, the forward part of the latch 26 is pressed down to move the latch out of engagement with the teeth 27, and then the slide 24 is moved at a right angle to the cutter 14 according to the amount that is to be cut off of the heel 38. If it is desired to make an angular cut transversely of the heel 38, the part 29 is raised—by the handle 48 or the handle 51—until it is out of engagement with the extension 28, and then the part 29 and consequently the shoe holding device is turned horizontally until the heel 38 is at the desired angle to the cutter 14. If it is desired to make an angular cut longitudinally of the heel 38, the jaw 36 is moved—by the handle 48 or the handle 51—out of engagement with the part 29, and then the jaw 36 and thereby the shoe holding device is turned vertically by the handle 51 until the heel 38 is disposed at the desired angle to the cutter 14. The guide bar 19, slide 24, and consequently the shoe holding device can be moved rearwardly by pressure on the handle 48, to move the heel 38 past the cutter 14 and thereby cut the heel 38.

The construction which has been particularly illustrated and described admits of changes and modifications, wherefore the right is reserved to all such changes and modifications as do not depart from the spirit and scope of the invention which is defined in the appended claims.

I claim:

1. Heel cutting apparatus comprising the combination of a cutter, a guide bar arranged at a right angle to the cutter and movable parallel to the cutter, a slide mounted on the guide bar, a part pivotally mounted on the slide, a jaw having an offset part pivotally mounted on said part, said offset part being provided with an opening, a second jaw movably connected to the first mentioned jaw, and a threaded rod passing through said opening and pivotally connected to the second jaw.

2. In heel cutting apparatus, the combination of a jaw having an offset part provided with a threaded opening, a second jaw slidable toward or from the first mentioned jaw, and a threaded rod passing through said opening and pivotally connected to the second jaw, said rod having opposite sides thereof cut away as set forth.

3. In heel cutting apparatus, the combination of a cutter, a slide, a spring-pressed part pivotally mounted on said slide, a spring-pressed part pivotally mounted on the first mentioned part, and a shoe holding device carried by the second mentioned spring-pressed part.

4. Heel cutting apparatus comprising the combination of a cutter, a guide bar disposed at a right angle to the cutter and movable parallel to said cutter, a slide mounted on the guide bar, a spring-pressed part pivotally connected to said slide, a spring-pressed part pivotally connected to the first mentioned spring-pressed part, and a shoe holding device carried by the second mentioned spring-pressed part.

5. In heel cutting apparatus, the combination of a cutter, a slide, a part pivotally connected to said slide, a spring adapted to press said part against said slide, a second part pivotally connected to the first mentioned part, a spring adapted to press said second part against the first mentioned part, and a shoe holding device carried by said second part.

6. In heel cutting apparatus, the combination of a cutter, a slide, a spring-pressed part pivotally connected to said slide, a jaw, a spring-pressed part on said jaw provided with a threaded opening and pivotally connected to the first mentioned part, a second jaw movably connected to the first mentioned jaw, and a threaded rod passing through said opening and pivotally connected to said second jaw, said rod having opposite sides thereof cut away as set forth.

7. Heel cutting apparatus comprising the combination of a cutter, a guide bar disposed at a right angle to said cutter and movable parallel to said cutter, a slide mounted on said guide bar, a spring-pressed part pivotally connected to said slide, a jaw having thereon a spring-pressed part pivotally connected to the first mentioned part and provided with a threaded opening, a second jaw movably connected to the first mentioned jaw, and a threaded rod passing through said opening and pivotally connected to said second jaw, said rod having opposite sides thereof cut away as set forth.

In testimony whereof, I have signed my name to this specification at Los Angeles, county of Los Angeles, State of California, this 6th day of June, A. D. 1917.

WILLIAM J. NESBITT.

Copies of this patent may be obtained for five cents each, by addressing the "Commissioner of Patents, Washington, D. C."